(12) United States Patent
Baturytski et al.

(10) Patent No.: US 8,239,238 B2
(45) Date of Patent: Aug. 7, 2012

(54) METHODS AND APPARATUS FOR ENCODING A WORK ITEM TYPE DEFINITION

(75) Inventors: Aliaksei Baturytski, Redmond, WA (US); Brian A. White, Seattle, WA (US); Jason L. Prickett, Raleigh, NC (US)

(73) Assignee: Microsoft Corporation, Redmond, WA (US)

( * ) Notice: Subject to any disclaimer, the term of this patent is extended or adjusted under 35 U.S.C. 154(b) by 1570 days.

(21) Appl. No.: 11/085,375

(22) Filed: Mar. 21, 2005

(65) Prior Publication Data

US 2006/0247964 A1 Nov. 2, 2006

(51) Int. Cl.
*G06Q 10/00* (2006.01)
(52) U.S. Cl. ............... 705/7.26; 705/7.27; 705/7.31; 709/213; 709/223; 717/100
(58) Field of Classification Search .............. None
See application file for complete search history.

(56) References Cited

U.S. PATENT DOCUMENTS

| | | | | |
|---|---|---|---|---|
| 5,940,804 A | * | 8/1999 | Turley et al. ............... | 705/9 |
| 6,105,057 A | * | 8/2000 | Kuftedjian et al. ......... | 709/213 |
| 6,606,740 B1 | * | 8/2003 | Lynn et al. ................. | 717/100 |
| 6,823,513 B1 | * | 11/2004 | McNally et al. ............ | 718/104 |
| 7,392,511 B2 | * | 6/2008 | Brokenshire et al. ....... | 717/143 |
| 2002/0052771 A1 | * | 5/2002 | Bacon et al. ............... | 705/8 |
| 2002/0055849 A1 | * | 5/2002 | Georgakopoulos et al. .. | 705/1 |
| 2003/0045958 A1 | * | 3/2003 | Brandt et al. .............. | 700/101 |
| 2003/0177046 A1 | * | 9/2003 | Socha-Leialoha .......... | 705/7 |

OTHER PUBLICATIONS

Workflow Management: Models, Methods, and Systems Adenekan Dedeke. Interfaces. Linthicum: Sep./Oct. 2004. vol. 34, Iss. 5; p. 408, 3 pgs.*
Organizational Management in Workflow Applications—Issues and Perspectives Michael Zur Muehlen Information Technology and Management; Jul.-Oct. 2004; 5, 3-4; ABI/INFORM Global p. 271.*
Akhil Kumar, Wil M P Van Der Aalst, & Eric M W Verbeek. (2002). Dynamic work distribution in workflow management systems: How to balance quality and performance. Journal of Management Information Systems, 18(3), 157-193.*
Edward A. Stohr, J. Leon Zhao. Information Systems Frontiers. Boston: Sep. 2001. vol. 3, Iss. 3; p. 281.*
Kim, Y., Kang, S., Kim, D., Bae, J., & Ju, K.. (2000). WW-FLOW: Web-Based Workflow Management with Runtime Encapsulation. IEEE Internet Computing, 4(3), 55-64.*
Decentralised Workflows and Software Agents J W Shepherdson; S G Thompson; B R Odgers BT Technology Journal; Oct. 1999; 17, 4; ABI/INFORM Global p. 65.*
Bolcer, G., & Kaiser, G.. (1999). SWAP: Leveraging the Web to Manage Workflow. IEEE Internet Computing, 3(1), 85-88.*
Jerry Z. Gao, Fukao Itaru, & Y. Toyoshima. (2002). Managing Problems for Global Software Production—Experience and Lessons. Information Technology and Management, 3(1-2), 85-112.*

(Continued)

*Primary Examiner* — Lynda Jasmin
*Assistant Examiner* — Gurkanwaljit Singh
(74) *Attorney, Agent, or Firm* — Chin IP, PLLC; Davin Chin

(57) ABSTRACT

Methods and apparatus are provided for encoding a work item type definition. In one embodiment, a method is provided for encoding the work item type definition as a data object, such as an XML document. The work item type definition may include a specification of workflow associated with the work item type, and//or a specification of the display of the work item type by a graphical user interface, such as that which may be provided by a workflow management application.

10 Claims, 6 Drawing Sheets

OTHER PUBLICATIONS

Begole, James Michael Allen (1999). Flexible collaboration transparency: Supporting worker independence in replicated application-sharing systems. Ph.D. dissertation, Virginia Polytechnic Institute and State University, United States—Virginia.*

Yongbeom Kim, & Edward a Stohr. (1998). Software Reuse: Survey and Research Directions. Journal of Management Information Systems, 14(4), 113-147.*

* cited by examiner

METHODS AND APPARATUS FOR ENCODING A WORK ITEM TYPE DEFINITION

FIELD OF INVENTION

This invention relates to computer-implemented workflow management systems.

BACKGROUND OF INVENTION

Workflow management systems are used by many organizations today to improve the efficiency with which work items are performed, by automating the process of distributing the work items to members of the organization. A workflow management system may include an electronic file storage (e.g., a database) containing information representative of work items, and a workflow application that accesses this information and disseminates it to members of the organization so that the work items may be addressed. Work items, or activities, may be categorized into particular work item types, such as "bugs", application features, requirements, tasks, issues, action items, or any other suitable work item type. Work item types implemented by conventional workflow management systems are typically related to the development or maintenance of one or more computer systems, such as the development or maintenance of one or more software applications.

FIGS. 1 and 2 depict the function and operation of a conventional workflow management system. FIG. 1 depicts an exemplary process which may be implemented by a conventional workflow management system to resolve a software application "bug", and FIG. 2 depicts an exemplary workflow management system configuration on which the process of FIG. 1 may be performed. In FIG. 2, system 200 includes server 210, on which resides database 215 and workflow application 217. Workflow application 217 communicates with workstations 220A-220D via network 225, which may comprise a local area network (LAN), wide area network (WAN), the Internet, other network(s), or a combination thereof. Workstations 220A-220D may be employed by operators to receive information and address work items. Respective workstations 220A-220D may each employ GUI 221A-221D to communicate with workflow application 217.

Upon the start of process 100 (FIG. 1), the bug is "opened" (i.e., made active) in act 110. For example, an operator of workstation 220A may input information via workflow application 217 to database 215 to indicate various characteristics of the bug, such as a description, its priority, the software application it affects, the platform on which the application executes, an indication that it is open and unresolved, and/or other characteristics. The process then proceeds to act 120, wherein the bug is assigned to an operator for resolution. For example, workflow application 217 may examine the information in database 215 and determine, based on various business rules, that the operator of workstation 220D is the most appropriate resource to resolve the bug. When act 120 completes, the process proceeds to act 130, wherein the operator of workstation 220D modifies the software application in an attempt to fix the bug. Upon tentatively determining that the bug is fixed, the operator may provide an indication via application 217 to be stored in database 215. The process then proceeds to act 140, wherein the tentative resolution is assigned for testing. For example, workflow application 217 may examine information in database 215 to determine that the operator of workstation 220C is the most appropriate resource to test the tentative resolution. In act 150, the application is tested, and in act 160, a determination is made as to whether the bug has been successfully resolved. If so, the process proceeds to act 170, wherein the bug is "closed" (i.e., given an indication in database 215 of having been resolved), and the process completes. If not, the process returns to act 120, so that the issue may be assigned (e.g., reassigned to the operator of workstation 220D) for resolution. In this respect, process 100 may be iterative.

With a conventional workflow management system such as system 200, it may be difficult to modify, and thus maintain, information relating to specific work item types. For example, making modifications to the manner in which information related to bugs is stored, the manner in which bugs are processed, resolved and/or managed, and/or the manner in which information on the work item type is displayed to an operator may require substantial modifications to a database (e.g., database 215) and/or a workflow application (e.g., application 217). As an example, to make changes to the way in which bugs are managed, a user may be required to change the schema of the database, modify the workflow application to implement one or more business rules differently, or both. This typically requires not only significant knowledge of the workflow management system, but also significant technical skill to develop computer programs to implement these changes effectively.

SUMMARY OF INVENTION

One embodiment of the invention provides a computer-implemented method of providing a definition for a work item type, the work item type comprising a category of activity related to a software development effort. The method comprises: (A) specifying at least one field, each field defining a characteristic of the work item type; and (B) specifying at least one definition from a plurality of definitions, the plurality of definitions including: a workflow definition which specifies a manner of processing the work item type, and a form definition which specifies a manner of displaying information related to the work item type on a graphical user interface; wherein the work item type definition is provided via a data object. If a workflow definition is provided, it may specify a plurality of states in which the work item type may reside, and a transition which may be performed between two of the plurality of states. The workflow definition may further specify a constraint on performing the transition.

Another embodiment of the invention provides a computer-readable medium on which is encoded a set of statements, the statements, when processed by a computer, providing a definition for a work item type, the statements collectively comprising a data object, the work item type comprising a category of activity related to a software development effort. The work item type definition comprises: at least one field, each field defining a characteristic of the work item type; and at least one definition from a plurality of definitions, the plurality of definitions including: a workflow definition which specifies a manner of processing the work item type, and a form definition which specifies a manner of displaying information related to the work item type on a graphical user interface. If a workflow definition is provided, it may specify a plurality of states in which the work item type may reside, and a transition which may be performed between two of the plurality of states. The workflow definition may further specify a constraint on performing the transition.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
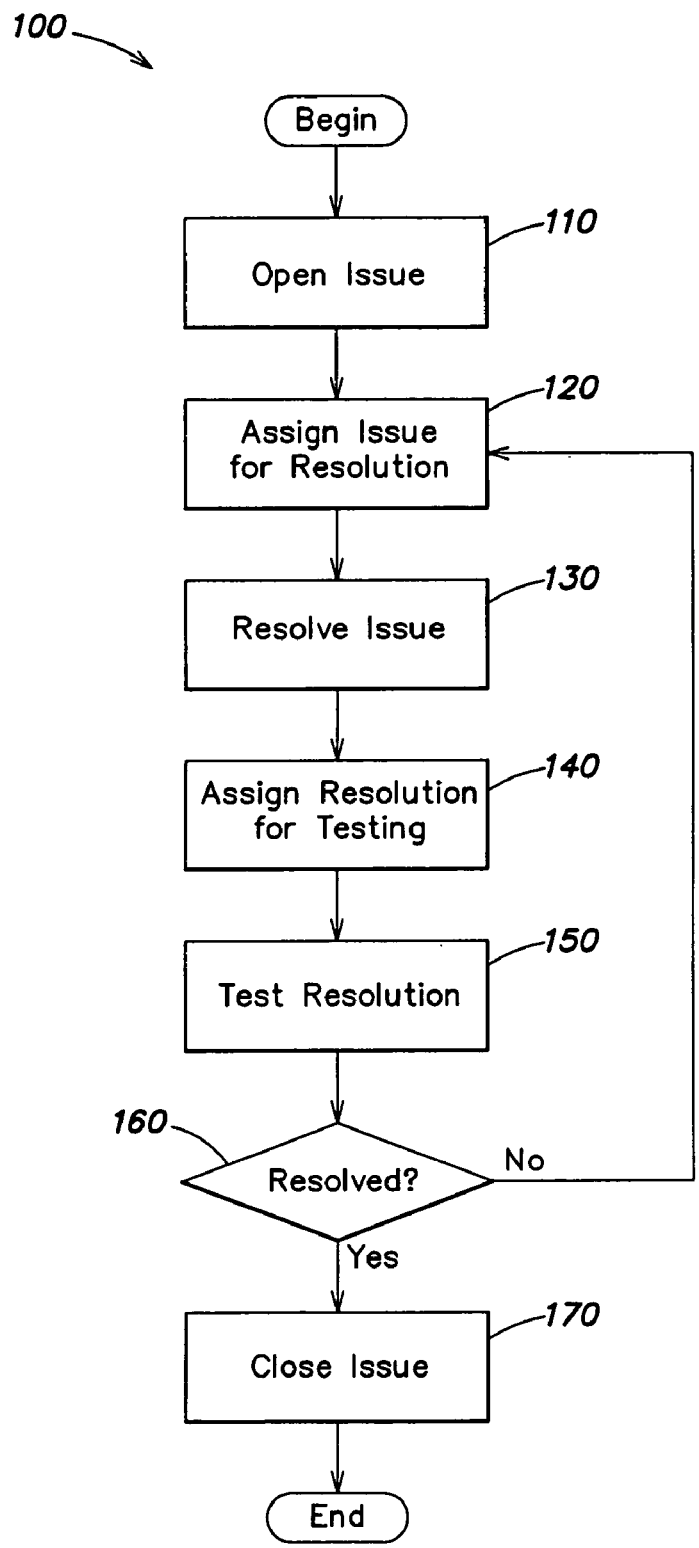
FIG. 1 is a flowchart depicting an exemplary technique for processing a work item by a workflow management system, according to the prior art.

In accordance with one embodiment of the invention, methods and apparatus are provided to enable work item types to be defined in a simple, flexible and unified way. For example, in one embodiment, a work item type definition language, based on the extensible markup language (XML), is provided to encode a work item type definition in a data object, such as an XML document. As a result, to make a change to the work item type definition (and therefore to the manner in which the work item type is managed, and/or the manner in which information is gathered and stored on the work item type), a user may simply modify the XML document instead of making more complicated changes to a database and/or workflow application. A user may also more intuitively grasp a higher-level language, such as an XML-based language, than the lower-level program languages that are typically used to implement database and/or workflow application changes.

A work item type definition may specify any of numerous traits and/or features of the work item type. For example, a work item type definition may specify one or more data fields that define characteristics of the work item type. For example, for a "bug" work item type, various data fields may define a description of the bug, the relative priority of the bug, the software application that the bug affects, to whom the bug is assigned for resolution, the current state of the bug, and/or other characteristics. Any suitable characteristic(s) may be defined, in any suitable quantity and fashion, as the invention is not limited in this respect.

One embodiment of a work item type definition may specify workflow associated with the work item type. For example, in one embodiment, a work item type definition may prescribe one or more valid states for the work item type, allowed transitions between the states, and one or more restrictions on performing those transitions. As an example, for a "bug" work item type, the work item type definition may specify valid states of "Active" and "Resolved," specify that a transition between the "Active" and "Resolved" states may occur only when the bug is fixed, and that only the operator who tests the resolution of the bug may perform this transition. Of course, the invention is not limited to defining workflow with respect to states, transitions, and/or transition rules, as any suitable technique for defining workflow may be employed.

According to one embodiment, a work item type definition may specify the display characteristics of the work item type on a graphical user interface (GUI), such as a workflow or editor application. In one example, a display specification may not be limited to a particular workflow application and/or platform (e.g., operating system), but rather may be flexible enough to suit any workflow application and/or platform. For example, a display specification may include instructions which are provided with reference to the overall display characteristics of the GUI, such that any GUI may process the instructions. Instructions may specify that particular fields associated with a work item type are grouped on a GUI display, particular controls for one or more of the fields are provided, and/or that groups or fields are arranged in a particular fashion. The display, or "form," definition for a work item type is described in greater detail below.

It should be appreciated that embodiments of the invention which provide a work item type definition via an XML-based data object provide substantial advantages over conventional approaches, owing partially to the widespread adoption of the XML standard and the ease with which a data object may be employed or incorporated by various computer programs. For example, workflow related to a work item type may be customized more easily than with conventional approaches, by simply configuring a workflow application to employ an updated data object in order to instantiate an updated work item type definition. Different workflow applications may be more easily configured to process work items of a considered type consistently, as each may simply employ the same work item type definition. Where a data object defines workflow for a work item type, a methodology for managing the work item type may be more easily automated. Organizations may disseminate information internally more effectively, as one division, for example, may share a work item type definition with another division so that work items of a considered type are managed consistently by both divisions. Organizations may also more easily share work item type definitions with third parties, such as systems integrators.

Figure 3:
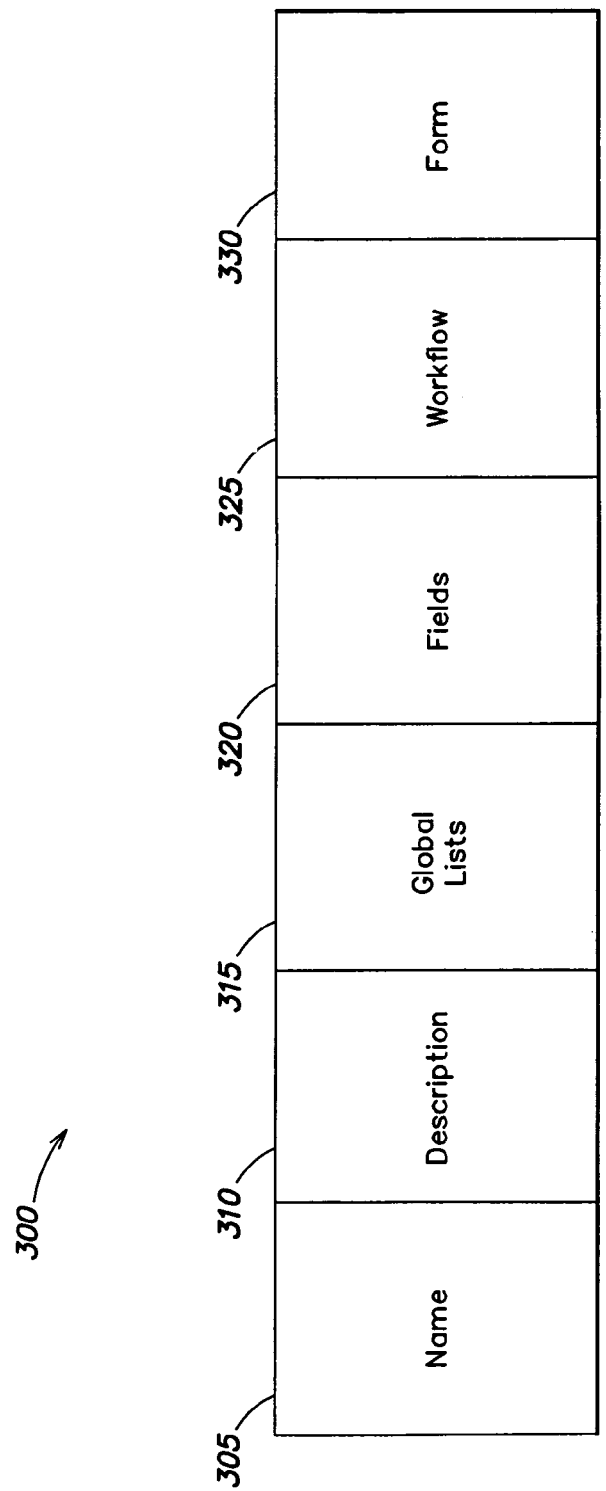
FIG. 3 is a block diagram depicting an exemplary data structure for defining a work item according to one embodiment of the invention.

FIG. 3 depicts the structure of an exemplary data object providing a work item type definition. Data object 300 includes six portions, including name portion 305, description portion 310, global lists portion 315, fields portion 320, workflow portion 325, and form portion 330. When provided in XML format, data object 300 may comply with the high-level framework shown in the sample XML document below. The sample shown is for the work item type "bug." Each of the portions in the sample shown are described briefly below, and a more detailed description of the <FIELDS>, <FORM> and <WORKFLOW> portions follows.

```
<WORKITEMTYPE name='bug'>
  <DESCRIPTION> Bug work item types are used to track defects
  with program code.
  </DESCRIPTION>
  <GLOBALLISTS>
  </GLOBALLISTS>
  <FIELDS>
  </FIELDS>
  <WORKFLOW>
  </WORKFLOW>
  <FORM>
  </FORM>
</WORKITEMTYPE>
```

The <WORKITEMTYPE> portion in the XML sample above includes a specification of the name of the work item type (in the sample above, "bug"). This portion corresponds to name portion 305 of data object 300 (FIG. 3). Other exemplary work item type names may include "feature", "requirement", "task", "risk" and "issue". Any suitable name for a work item type may be used. The work item type name is typically unique within a particular software development project, although the invention is not limited in this respect.

The <DESCRIPTION> portion in the XML sample above includes a description for a work item type. This portion corresponds to the description portion 310 of data object 300 (FIG. 3). The work item type description may include text which is descriptive of the work item type. This information may be helpful, for example, when a user of a workflow application which has implemented the work item type definition seeks to understand the difference between a "risk" work item type and an "issue" work item type.

The <GLOBALLISTS> portion in the XML sample above includes a specification of global lists. This portion corresponds to global list portion 315 in data object 300. Global lists may, for example, provide lists of values which are used more than once (i.e., for multiple fields) within a work item type definition, or across multiple work item type definitions. Because global lists may provide allowed values for fields, they are described in greater detail below with respect to fields.

The <FIELDS> portion in the XML sample above includes a specification of data fields which provide various characteristics of the work item type. This portion corresponds to field portion 320 in data object 300. As discussed above, for a "bug" work item type, this portion may define data fields such as a description of the bug, its priority, the application to which it relates, to whom it is assigned, its current state, and/or other characteristics of the bug.

The <WORKFLOW> portion in the XML sample above includes a specification of workflow for the work item type. This portion corresponds to the workflow portion 325 in data object 300. As discussed above, workflow may include one or more allowed states for the work item type, valid transitions between the states, and restrictions on performing one or more of the transitions.

The <FORM> portion in the XML sample above includes a specification of the display of the work item type, such as by a workflow application. This portion corresponds to form portion 330 in data object 300. The form specification may define how fields that define the work item type are presented and manipulated by a user on a GUI.

Each of the fields, form and workflow portions is described in greater detail below.

I. Fields

As described above, a work item type definition may include a specification of various data fields which define characteristics of the work item type. In one embodiment, the specification of each field may include its name, a reference name, a field type, help text, and/or a set of behaviors or constraints. Each of these field characteristics is described below with reference to the following XML sample, which defines two fields.

```
<FIELD refname="System.Title" name="Title" type="String" >
    <HELPTEXT> Enter a brief description of the work item
    </HELPTEXT>
    <REQUIRED />
</FIELD>
<FIELD refname="MyCorp.CusSeverity" name="Customer Severity"
type="String">
    <HELPTEXT> Enter the severity of the problem</HELPTEXT>
    <ALLOWEDVALUES>
        <LISTITEM value='Emergency'>
        <LISTITEM value='Major'>
        <LISTITEM value='Minor'>
```

-continued

```
    </ALLOWEDVALUES>
    <DEFAULT from 'value' value='Minor' />
</FIELD>
```

In the sample above, the first field has a name of "Title" and the second has a name of "Customer Severity". A field may have any suitable name, as the invention is not limited in this respect. In one embodiment, a field name may be a unique identifier for the field within the context of a particular project.

In one embodiment, because individual fields may be renamed (e.g., by an administrator who employs an editor application to modify the work item type definition), field names may not be consistent across an organization, or between an organization and a third party. Thus, in one embodiment, fields may be given a "reference name" to facilitate easier exchange of field data. A reference name may be a universally unique identifier for the field. As an example, the fields in the sample above have reference names of "System.Title" and "MyCorp.CusSeverity", respectively. Of course, the invention is not limited to using reference names to ensure the uniqueness of field names between parties and/or organizations, as any suitable technique may be employed.

In one embodiment, a type may be specified for a field. The type may, for example, define a kind and/or size of data contained in a field. For example, the fields in the sample above each have a type of "String" (meaning that each field comprises a string of alphanumeric text data). Any suitable field type may be specified, such as a string, integer, double (i.e., floating point value), date or time, text, HTML, tree path and/or history types.

In one embodiment, help text may be defined for a field, to provide guidance to a user as to what information should be provided or selected for a field. For example, the field in the sample above which has a name of "Title" has help text associated which states that the user should "Enter a brief description of the work item". Any suitable help text may be provided for a field. Help text may be defined, for example, by an administrator.

One or more rules may be defined for a field. In one embodiment, field rules may be categorized as constraints, lists, defaults and conditions. Each category is described below.

Field constraints may be provided to define whether and what kind of data may be provided or selected by a user for a particular field. For example, the first field in the sample above (i.e., having a name of "Title") includes a specification that the field is required (i.e., that the user must provide or select data for the field). This is indicated by the <REQUIRED/> parameter. Constraints are not limited to specifying that a field is required, as any suitable constraint(s) may be placed on a field. For example, constraints may specify that a field is read-only (i.e., may not be modified by a user), specify that a value for a field can not be, or must be, the same as the value for another field, and/or impose any other suitable constraint.

Further, a constraint may include an attribute which indicates that the constraint does or does not apply for particular users and/or groups. Using the example of the <REQUIRED/> parameter, a constraint may be specified as <REQUIRED for='redmond\aliakb'/> or <REQUIRED not='redmond\aliakb'/> to indicate that the considered field is required for the user 'redmond\aliakb' or for all users except the user 'redmond\aliakb', respectively. In another example using the <REQUIRED/> parameter, a constraint may be specified as <REQUIRED for='group1' not='group2'/> to indicate that the field is required for users who are members of 'group1' and not members of 'group2'.

Field lists may be specified to provide a set of values for a field. For example, a list may provide a set of allowed values for the field, such that the user may select from the values. For example, the second field in the sample above (i.e., named "Customer Severity") provides a specification that a list of allowed values includes "Emergency", "Major" and "Minor". The user may select one of these values to specify data for the field. A field list may also specify a default value selected for the field. For example, the second field in the sample above specifies that the "Minor" value is the default value for the field. Some workflow applications may, for example, be configured to present the default value first to a user, and accept a selection of another list value if the user desires.

Field lists are not limited to allowed values. Any suitable type of field values may be provided in a list. For example, a list may provide prohibited field values (such that a user may not provide or specify a value for the field which exists in the list), suggested field values, or any other suitable type of value.

As described above, global lists may be provided to define values for multiple fields. For example, several work item types may share a field which specifies the operating system executing on a system. Each work item type may refer to a global list which provides an indication of the operating systems resident on the system. As a result, an administrator need not modify each work item type definition each time the list is updated, but rather may simply modify a single global list. A global list may be provided and/or referenced in any suitable fashion, as the invention is not limited in this respect.

Field conditions may be imposed, for example, to make field value lists interdependent. For example, given two field value lists, the values presented in the second list may be dependent on the value selected in the first list. As an example, a first list may specify a set of operating systems, and the second list may specify a set of versions for the selected operating system. Thus, if a user selects a particular operating system from the first list (e.g., Microsoft Windows), a different set of versions are presented in the second list (e.g., XP, 98, 2000) than if the user had selected another operating system (e.g., Unix) in the first list.

Field conditions may also, or alternatively, be imposed for any other suitable purpose. For example, a condition may be imposed such that when a user makes a change to a first field value, the value of a second field is also changed to ensure consistency between the fields. Using the example above, if a user changed the "operating system" field from Unix to Windows, a field condition may dictate that the "version" field value change from a version of Unix (e.g., HP, Solaris, etc.) to a version of Windows (e.g., XP, which may be designated as a default version when Windows is selected as the operating system). Any suitable condition may be imposed on any field, as the invention is not limited in this respect.

II. Form

Figure 2:
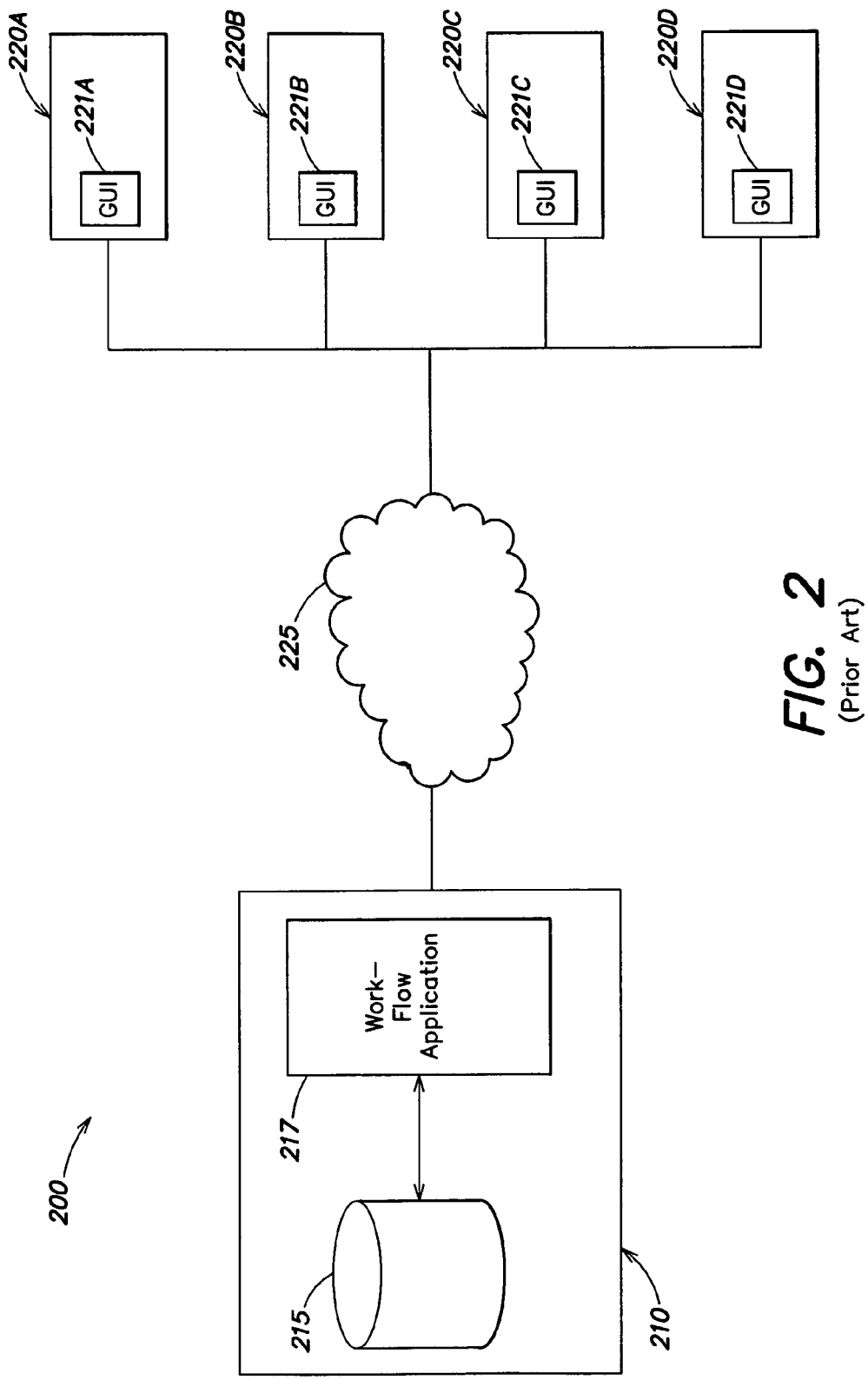
FIG. 2 is a block diagram depicting an exemplary workflow management system, according to the prior art.

In one embodiment, the form, or display, of a work item type may be specified by the work item type definition. The form specification may define how the work item type is displayed, such as by an application (e.g., workflow application 217 shown in FIG. 2). Any of numerous display characteristics may be defined for a work item type. For example, a work item type form specification may define that particular fields are grouped on a display, how fields are grouped, how a grouping is presented with respect to a chosen interface, and/or controls which are provided by an interface to allow the user to select or provide data for each field.

Each of these form characteristics is described below with reference to the following XML sample and FIG. 4, which depicts an exemplary display of a work item type. More specifically, the following XML sample is provided first to illustrate the overall framework of a form definition, and a description of the interface of FIG. 4 with reference to specific excerpts follows.

```
<FORM>
  <Layout>
    <Group>
      <Column PercentWidth="100">
        <Control Type="FieldControl" FieldName="System.Title"
                Label="Title" LabelPosition="Left"/>
      </Column>
    </Group>
    <Group>
      <Column PercentWidth="70">
        <Group>
          <Column PercentWidth="100">
            <Group Label="Classification">
              <Column PercentWidth="100">
                <Control Type="TFStructureControl"
                        FieldName="System.AreaPath"
                        Label="Area" LabelPosition="Left"/>
                <Control Type="TFStructureControl"
                        FieldName="System.IterationPath"
                        Label="Iteration" LabelPosition="Left"/>
              </Column>
            </Group>
          </Column>
        </Group>
      </Column>
      <Column PercentWidth="30">
        <Group Label="Status">
          <Column PercentWidth="100">
            <Control Type="FieldControl"
                    FieldName="System.AssignedTo"
                    Label="Assigned To" LabelPosition="Left"/>
            <Control Type="FieldControl"
                    FieldName="Microsoft.VSTS.Common.Priority"
                    Label="Priority" LabelPosition="Left"/>
            <Control Type="FieldControl"
                    FieldName="System.State"
                    Label="State" LabelPosition="Left"/>
            <Control Type="FieldControl"
                    FieldName="System.Reason"
                    Label="Reason" LabelPosition="Left"/>
            <Control Type="FieldControl"
                    FieldName="Microsoft.VSTS.Common.Triage"
                    Label="Triage" LabelPosition="Left"/>
          </Column>
        </Group>
      </Column>
    </Group>
    <TabGroup>
      <Tab Label="Summary">
        <Control Type="FieldControl"
                FieldName="Microsoft.VSTS.Common.Summary"
                Label="Summary" LabelPosition="Top"/>
        <Control Type="WorkItemLogControl"
                FieldName="System.History"
                Label="Detailed Description and History"
                LabelPosition="Top" Dock="Fill"/>
      </Tab>
      <Tab Label="Links">
        <Control Type="LinksControl"/>
      </Tab>
      <Tab Label="File Attachments">
        <Control Type="AttachmentsControl"/>
      </Tab>
      <Tab Label="Details">
        <Group>
          <Column PercentWidth="50">
            <Group>
              <Column PercentWidth="100">
                <Control Type="FieldControl"
                        FieldName="Microsoft.VSTS.Common.Issue"
```

```
                Label="Issue" LabelPosition="Left"/>
            <Control Type="FieldControl"
                FieldName="Microsoft.VSTS.Build.FoundIn"
                Label="Found In Build" LabelPosition="Left"/>
            <Control Type="FieldControl"
                FieldName="Microsoft.VSTS.Build.
                IntegrationBuild"
                Label="Resolved In Build"
                LabelPosition="Left"/>
        </Column>
      </Group>
    </Column>
    <Column PercentWidth="50">
      <Group Label="Test">
        <Column PercentWidth="100">
            <Control Type="FieldControl"
                FieldName="Microsoft.VSTS.Test.TestName"
                Label="Name" LabelPosition="Left"/>
            <Control Type="FieldControl"
                FieldName="Microsoft.VSTS.Test.TestId"
                Label="Id" LabelPosition="Left"/>
            <Control Type="FieldControl"
                FieldName="Microsoft.VSTS.Test.TestPath"
                Label="Path" LabelPosition="Left">
        </Column>
      </Group>
    </Column>
  </Group>
 </Tab>
</TabGroup>
</Layout>
</FORM>
```

Figure 4:
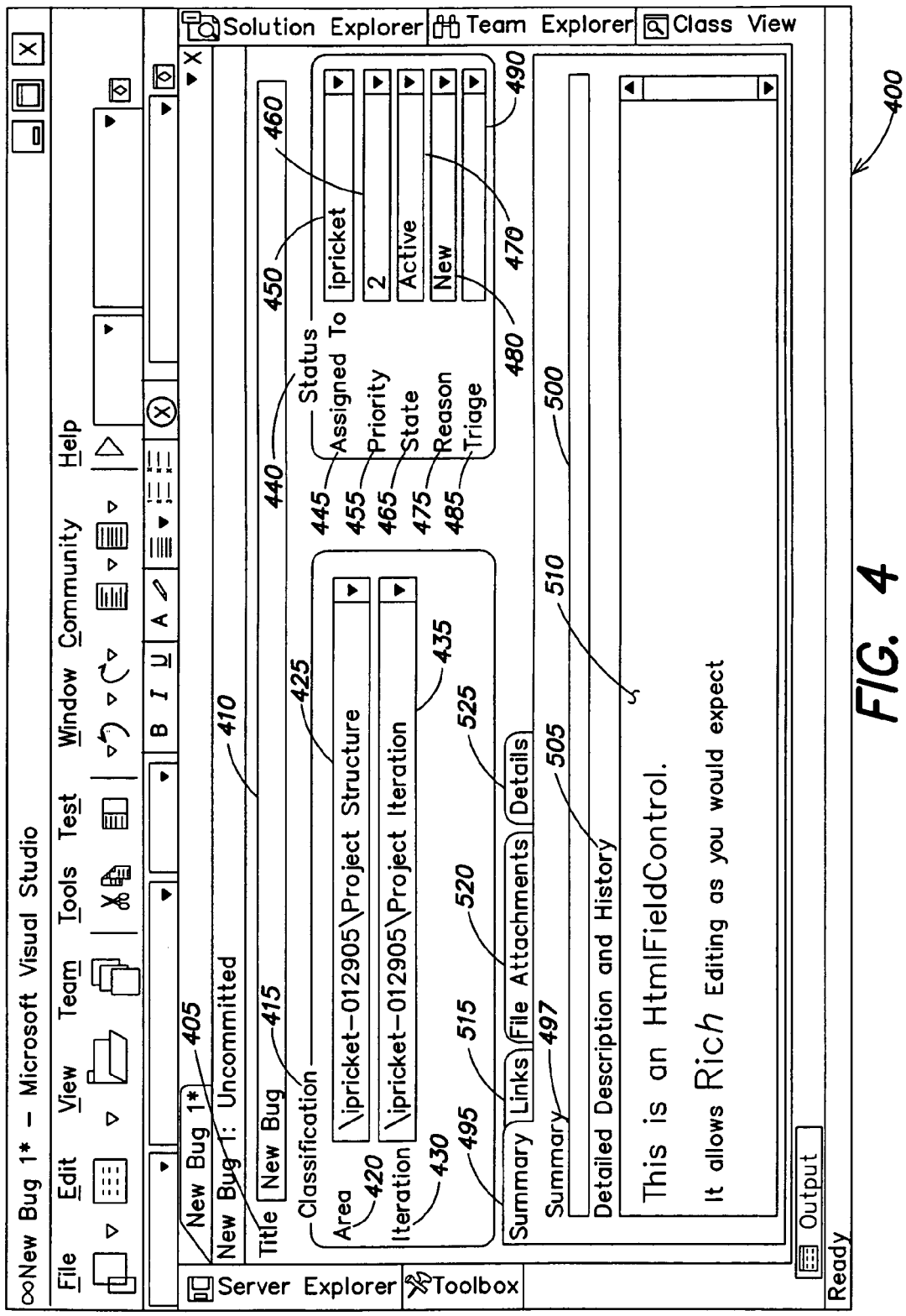
FIG. 4 depicts an exemplary graphical user interface for displaying information related to a work item according to one embodiment of the invention.

The interface 400 shown in FIG. 4 includes four primary display portions, each of which are defined by the XML sample above. Specifically, interface 400 includes a portion having label 405 ("Title"), a "group" portion having group label 415 ("Classification") a second group portion having group label 440 ("Status"), and a "tab group" portion having a set of tab labels 495, 515, 520 and 525.

The portion of interface 400 having label 405 is defined in the following excerpt from the XML sample document above:

```
<Group>
  <Column PercentWidth="100">
    <Control Type="FieldControl" FieldName="System.Title"
        Label="Title" LabelPosition="Left"/>
  </Column>
</Group>
```

This excerpt indicates that a "Group" is defined, and that the group includes a single "Column". The column is defined by the attribute "PercentWidth" as occupying one hundred percent of the width of interface 400. The group includes the label 405 and field control 410 (i.e., having control type of "FieldControl"), which may allow a user to provide typewritten input to specify a title for a work item. The label 405 is defined by the "LabelPosition" attribute to be left-justified on interface 400.

The portion of interface 400 having group label 415 ("Classification") is defined by the following excerpt from the sample XML document above:

```
<Group>
  <Column PercentWidth="70">
    <Group>
      <Column PercentWidth="100">
```

```
      <Group Label="Classification">
        <Column PercentWidth="100">
            <Control Type="TFStructureControl"
                FieldName="System.AreaPath"
                Label="Area" LabelPosition="Left"/>
            <Control Type="TFStructureControl"
                FieldName="System.IterationPath"
                Label="Iteration" LabelPosition="Left"/>
        </Column>
      </Group>
    </Column>
  </Group>
</Column>
```

The excerpt indicates that the group is first defined as a "Column" portion of interface 400. More particularly, this column portion is defined by the "PercentWidth" attribute to occupy seventy percent of the width of interface 400. The fields having labels 420 ("Area") and 430 ("Iteration") and their respective field controls are defined by another "PercentWidth" attribute as occupying one hundred percent of this (seventy percent) portion of the interface. Each of the fields having labels 420 and 430 has an associated field control of the type "TFStructureControl" which may allow a user to specify a location for the "area" and "iteration" of the considered work item from among locations presented to a user in a tree structure. Each of labels 420 and 430 are defined by the "LabelPosition" attribute as being left-justified within the group display.

The group portion having group label 440 ("Status") is defined by the following excerpt:

```
  <Column PercentWidth="30">
    <Group Label="Status">
        <Column PercentWidth="100">
            <Control Type="FieldControl"
                FieldName="System.AssignedTo"
                Label="Assigned To" LabelPosition="Left"/>
            <Control Type="FieldControl"
                FieldName="Microsoft.VSTS.Common.Priority"
                Label="Priority" LabelPosition="Left"/>
            <Control Type="FieldControl"
                FieldName="System.State"
                Label="State" LabelPosition="Left"/>
            <Control Type="FieldControl"
                FieldName="System.Reason"
                Label="Reason" LabelPosition="Left"/>
            <Control Type="FieldControl"
                FieldName="Microsoft.VSTS.Common.Triage"
                Label="Triage" LabelPosition="Left"/>
        </Column>
    </Group>
  </Column>
</Group>
```

This excerpt indicates that the group is also defined to occupy a column portion of the interface, and that this column portion is defined to occupy the remaining thirty percent of the width of the interface. The fields having labels 445 ("Assigned To"), 455 ("Priority"), 465 ("State"), 475 ("Reason") and 485 ("Triage") are defined to occupy one hundred percent of this (thirty percent) portion, and each label is defined to be left-justified within this portion. Each is associated with a field control having type "FieldControl", which may allow a user to select a value for the considered field from a pick-list. In one embodiment, the values in each pick-list may be defined as described above with reference to field list values. As an example, the definition for the field having the label "Assigned To" may include a list of values which includes the value "jpricket".

The tab group portion of interface 400 is defined generally by the following excerpt from the XML sample document above:

```
<TabGroup>
    <Tab Label="Summary">
        <Control Type="FieldControl"
            FieldName="Microsoft.VSTS.Common.Summary"
            Label="Summary" LabelPosition="Top"/>
        <Control Type="WorkItemLogControl"
            FieldName="System.History"
            Label="Detailed Description and History"
            LabelPosition="Top" Dock="Fill"/>
    </Tab>
    <Tab Label="Links">
        <Control Type="LinksControl"/>
    </Tab>
    <Tab Label="File Attachments">
        <Control Type="AttachmentsControl"/>
    </Tab>
    <Tab Label="Details">
    </Tab>
</TabGroup>
</Layout>
</FORM>
```

This excerpt indicates that the tab group includes four tabs, having labels 495 ("Summary"), 515 ("Links"), 520 ("File Attachments") and 525 ("Details"). As interface 400 indicates, the tab having label 495 is selected for display, such that the controls specific to this tab portion are presented to a user. Specifically, two controls are presented. Control 500 is associated with label 497 ("Summary", which is defined by the attribute "LabelPosition" as being above the control on the interface 400) and is of the type "FieldControl". Similarly, control 510 is associated with label 505 ("Detailed Description and History") and is of the type "WorkItemLogControl".

It should be appreciated that any of numerous types of display and/or field controls may be defined by a work item type definition. While interface 400 illustrates several of the possible controls, any suitable number may be provided. The invention is not limited to providing any number or type of display control(s).

In one embodiment, the display controls which are available for use in a work item type definition may be provided in an XML schema, which may be referenced by the work item type definition. Those skilled in the art will appreciate that an XML schema is an XML document which describes the structure and features of other XML documents. An XML schema may, for example, define specific controls for a group, column, tab group, tab, or other display, as well as the specific field controls which may be employed to receive and present information from and to a user. An exemplary XML schema which may be employed to define display controls and other work item type definition characteristics is provided as Appendix A.

In addition, it should be appreciated that a work item type definition may specify the display of a work item type on any suitable application (e.g., workflow application), which may execute on any suitable platform (e.g., operating system). In one embodiment, operability with a particular application and/or platform is enabled via a "Layout Target" attribute which references an XML schema. However, the invention is not limited in this respect, as any suitable technique for ensuring cross-application and cross-platform operability may be employed.

III. Workflow

In one embodiment, the workflow associated with a work item type may be specified by the work item type definition.

The workflow specification may define any of numerous workflow characteristics. For example, a work item type definition may define a set of allowed states for the work item type, the allowed transitions between the states, and/or allowed reasons for one or more transitions. Each of these workflow characteristics is described below with reference to the following XML sample.

```
<WORKFLOW>
    <STATES>
        <STATE value='Active' />
        <STATE value='Complete' />
    </STATES>
    <TRANSITIONS>
        <TRANSITION from ' ' to='Active'>
            <REASONS>
                <DEFAULTREASON value='New' >
            </REASONS>
        </TRANSITION>
        <TRANSITION from "Active' to 'Complete' for='AllTesters'
            not='AllDevelopers'>
            <REASONS>
                <DEFAULTREASON value='Deferred' />
                <REASON value='No Plans To Fix' />
            </REASONS>
        </TRANSITION>
    </TRANSITIONS>
</WORKFLOW>
```

The <STATES> portion defines the valid states for the work item type. In one embodiment, "state" may be identified as a field within the <FIELDS> portion of the work item type definition, and may be given a list of allowed values which includes the allowed states provided in this XML sample (i.e., 'Active' and 'Complete'). In one embodiment, a blank (i.e., ' ') state may also be allowed. Any suitable number of states may be provided for a work item type.

The <TRANSITIONS> portion defines the allowed shifts between the allowed states, and allowed reasons for those shifts. The sample above provides two allowed transitions: from a ' ' (i.e., blank) state to an "Active" state, and from an "Active" state to a "Complete" state. For the transition from a blank to an "Active" state, only a single allowed reason for the transition is provided (i.e., that the work item type is "New"). In this example, the allowed reason is provided as a default, meaning that, in one embodiment, an interface which displays the reason to a user may cause the "New" reason to be selected automatically when this transition is initiated.

For the transition from an "Active" to a "Complete" state, two allowed reasons are provided. That is, a first allowed reason is that the work item type is "Deferred". Again, in this example, this reason is specified as the default reason, meaning that an interface which may display the reason to a user may cause the "Deferred" reason to be selected automatically when the transition is initiated. However, a second allowed reason (i.e., that there is "No Plans To Fix" the work item type) is also provided, such that the two allowed reasons may be provided in a pick list on the interface, and a user may be allowed to select the second reason (thereby overriding the default).

This transition may also define a security function. Specifically, it defines that only a specific group of users (i.e., "AllTesters") may perform the specified transition, and that another group of users (i.e., "AllDevelopers") may not perform the specified transition. Any suitable number and type of security function(s) may be provided, each of which may define any suitable criteria for a transition. Further, when a security function specifies that a user group may or may not perform a particular transition, the user group may be specified in any suitable manner.

In one embodiment, workflow-related characteristics of a work item type may drive the application of additional rules. For example, a state in which a work item type may reside can drive the application of rules related to fields which may be associated with the work item type. This feature is described with reference to the following XML sample:

```
<STATE value="Active">
    <FIELDS>
        <FIELD name="Mush">
            <REQUIRED />
        </FIELD>
        <FIELD name="Room">
            <READONLY/>
        </FIELD>
    </FIELDS>
</STATE>
```

In this example, the field "Mush" is required and the field "Room" is read-only, but only when the state of the work item type is defined as "Active". Rules related to fields may be defined and applied for any suitable work item type characteristic. For example, rules related to fields may be defined for a state (as illustrated above), a transition between states, a reason for a transition and/or a default reason for a transition. Of course, rules are not limited to being related to fields, as any suitable rule for a work item type characteristic may be defined, and a rule may impose any suitable constraint or condition.

In one embodiment, a work item type definition may specify one or more automated actions which are to occur automatically upon the occurrence of a transition. For example, in the software development context, a work item type definition may specify that when a work item type experiences a transition from "Active" to "Complete", the software module to which the considered work item relates is automatically "checked in" with a source code control utility, such that the most recent correct version is acknowledged by the utility. Any suitable automated action may be defined, as the invention is not limited in this respect.

Figure 5:
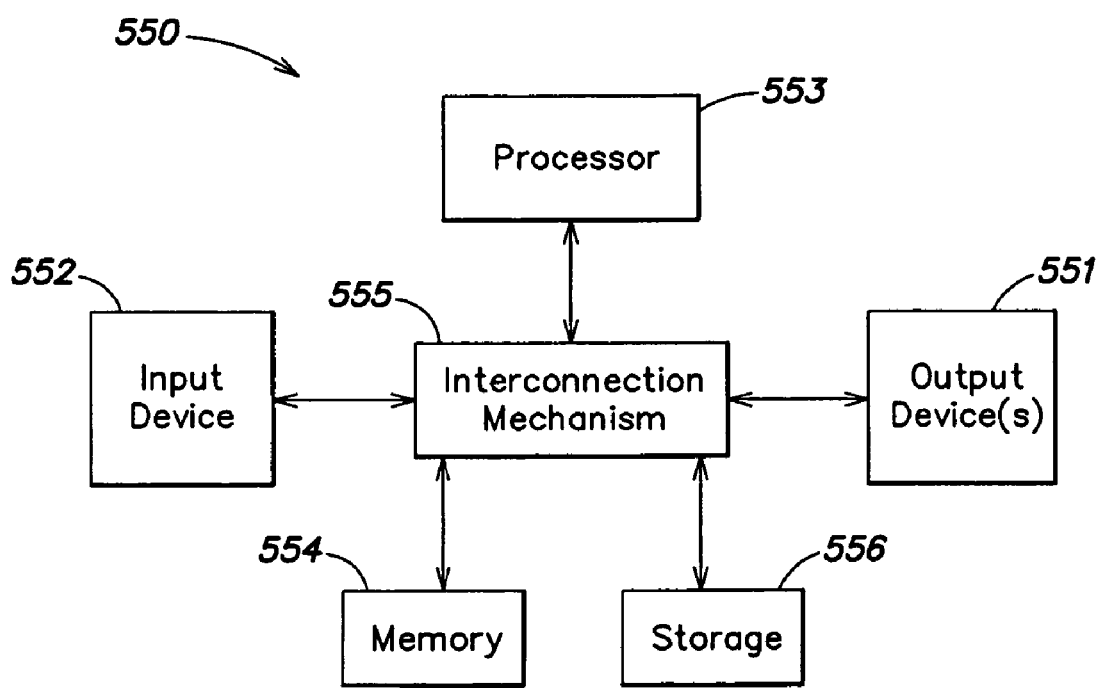
FIG. 5 is a block diagram of a computer system on which embodiments of the invention may be implemented.

Various aspects of the invention may be implemented on one or more computer systems, such as the exemplary computer system 550 shown in FIG. 5. Computer system 550 includes input devices 552, output devices 551, processor 553, memory system 554 and storage 556, all of which are coupled, directly or indirectly, via interconnection mechanism 555, which may comprise a bus or switch. The input devices 552 receive input from a user or machine (e.g., a human operator, or telephone receiver), and the output devices 551 display or transmit information to a user or machine (e.g., a liquid crystal display).

The processor 553 executes a program called an operating system which controls the execution of other computer programs, and provides scheduling, input/output and other device control, accounting, compilation, storage assignment, data management, memory management, communication and data flow control. The processor and operating system define the computer platform for which application programs in other computer programming languages are written.

The processor 553 may also execute one or more programs to implement various functions, such as those which embody aspects of the invention. These programs may be written in a computer programming language such as a procedural programming language, object-oriented programming language, macro language, or combination thereof.

Figure 6:
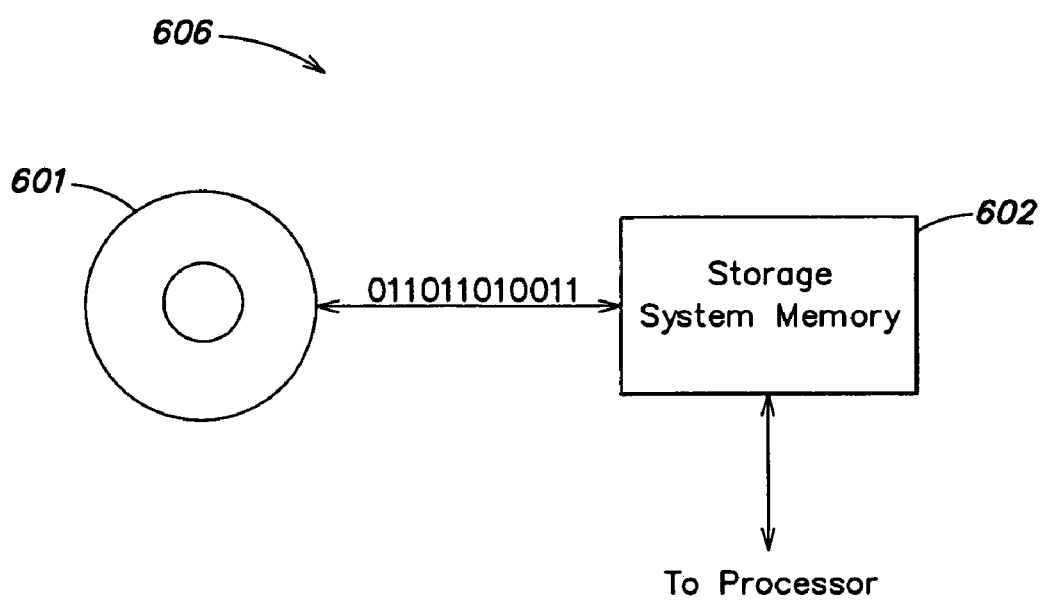
FIG. 6 is a block diagram of a storage system on which embodiments of the invention may be implemented.

These programs may be stored in storage system 556. The storage system may hold information on a volatile or non-volatile medium, and may be fixed or removable. The storage system is shown in greater detail in FIG. 6. It typically includes a computer-readable and writeable nonvolatile recording medium 601, on which signals are stored that define the program, or information to be used by the program. The medium may, for example, be a disk or flash memory. Typically, in operation, the processor 553 causes data to be read from the nonvolatile recording medium 601 into a volatile memory 602 (e.g., a random access memory, or RAM) that allows for faster access to the information by the processor 553 than does the medium 601. This memory 602 may be located in storage system 606, as shown in FIG. 6, or in memory system 554, as shown in FIG. 5. The processor 553 generally manipulates the data within the integrated circuit memory 554, 602 and then copies the data to the medium 601 after processing is completed. A variety of mechanisms are known for managing data movement between the medium 601 and the integrated circuit memory element 554, 602, and the invention is not limited thereto. The invention is also not limited to a particular memory system 554 or storage system 556.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for providing a definition for a work item type usable by a plurality of applications, the work item type comprising a category of activity related to a software development effort, the method comprising:

employing at least one computer processor to:
(A) specify a plurality of fields, comprising a first field and a second field, for the work item type, each of the plurality of fields defining a characteristic of the work item type and having one or more allowed field values from which a user can select a selected field value, a field condition specifying that upon a change to a selected field value for the first field, a field value for the second field is changed to maintain consistency between the selected value for the first field and the selected value for the second field;
(B) specify a plurality of definitions comprising:
a workflow definition which specifies a manner of processing, by the plurality of applications, the work item type, the workflow definition specifying:
states for the work item type,
one or more allowed transitions between the states,
one or more restrictions on an allowed transition, and
one or more actions to be automatically initiated upon an occurrence of an allowed transition, and
a form definition which specifies a manner of displaying, by the plurality of applications, information related to the work item type on a display, the form definition specifying:
a manner of grouping one or more of the plurality of fields on the display,
a manner in which a grouping is presented on a particular display, and one or more controls, each enabling a user to provide data for one or more of the plurality of fields; and (C) enable a user to access the work item type definition to modify the workflow definition and form definition specified in (B);

wherein the work item type definition is provided via a data object.

2. The method of claim 1, wherein the data object is an XML document.

3. The method of claim 2, wherein the XML document references an XML schema.

4. The method of claim 1, wherein the act (B) comprises providing a form definition which specifies a display of a label for at least one of the plurality of fields.

5. The method of claim 4, wherein the form definition further specifies a display of a respective label for each of a plurality of the fields, and wherein the form definition further specifies arranging the labels into a group.

6. A computer-readable storage medium on which is encoded a set of instruction which, when executed by a computer, perform a method of providing a definition for a work item type usable by a plurality of applications, the work item type comprising a category of activity related to a software development effort, the method comprising:

(A) specifying a plurality of fields, comprising a first field and a second field, for the work item type, each of the plurality of fields defining a characteristic of the work item type and having one or more allowed field values from which a user can select a selected field value, a field condition specifying that upon a change to a selected field value for the first field, a field value for the second field is changed to maintain consistency between the selected value for the first field and the selected value for the second field;

(B) specifying a plurality of definitions comprising:
a workflow definition which specifies a manner of processing, by the plurality of applications, the work item type, the workflow definition specifying:
states for the work item type,
one or more allowed transitions between the states, and one or more restrictions on an allowed transition, and
one or more actions to be automatically initiated upon an occurrence of an allowed transition, and a form definition which specifies a manner of displaying, by the plurality of applications, information related to the work item type on a display, the form definition specifying:
a manner of grouping one or more of the plurality of fields on the display,
a manner in which a grouping is presented on a particular display, and
one or more controls, each enabling a user to provide data for one or more of the plurality of fields; and (C) enabling a user to access the work item type definition to modify the workflow definition and form definition specified in (B).

7. The computer-readable storage medium of claim 6, wherein the data object is an XML document.

8. The computer-readable storage medium of claim 7, wherein the XML document references an XML schema.

9. The computer-readable storage medium of claim 6, wherein the act (B) comprises providing a form definition which specifies a display of a label for at least one of the plurality of fields.

10. The computer-readable storage medium of claim 9, wherein the form definition further specifies a display of a respective label for each of a plurality of the fields, and wherein the form definition further specifies arranging the labels into a group.

* * * * *